(12) United States Patent
Hall et al.

(10) Patent No.: US 10,407,888 B2
(45) Date of Patent: Sep. 10, 2019

(54) AUTOMATIC BIDET WAND AIMING SYSTEM BASED ON USER'S CENTER OF MASS

(71) Applicants: David R. Hall, Provo, UT (US); Travis Niederhauser, Mapleton, UT (US); Jared Reynolds, Pleasant Grove, UT (US); Joshua Larsen, Spanish Fork, UT (US); Ben Swenson, Lehi, UT (US); Clayton Jorgensen, Bountiful, UT (US); Andrew Nguyen, Provo, UT (US); Terrece Pearman, Draper, UT (US); Daniel Hendricks, Provo, UT (US)

(72) Inventors: David R. Hall, Provo, UT (US); Travis Niederhauser, Mapleton, UT (US); Jared Reynolds, Pleasant Grove, UT (US); Joshua Larsen, Spanish Fork, UT (US); Ben Swenson, Lehi, UT (US); Clayton Jorgensen, Bountiful, UT (US); Andrew Nguyen, Provo, UT (US); Terrece Pearman, Draper, UT (US); Daniel Hendricks, Provo, UT (US)

(*) Notice: Subject to any disclaimer, the term of this patent is extended or adjusted under 35 U.S.C. 154(b) by 4 days.

(21) Appl. No.: 15/862,091

(22) Filed: Jan. 4, 2018

(65) Prior Publication Data

US 2019/0203454 A1 Jul. 4, 2019

(51) Int. Cl.
*E03D 9/08* (2006.01)
*G05D 3/12* (2006.01)
*G06K 9/00* (2006.01)
*E03C 1/05* (2006.01)

(52) U.S. Cl.
CPC ............ *E03D 9/08* (2013.01); *E03C 1/057* (2013.01); *G05D 3/12* (2013.01); *G06K 9/00362* (2013.01)

(58) Field of Classification Search
CPC ..................................................... E03D 9/08
USPC ........................................................ 4/420.4
See application file for complete search history.

(56) References Cited

U.S. PATENT DOCUMENTS 9,756,297 B1* 9/2017 Clements ........... G06K 9/00771

\* cited by examiner

*Primary Examiner* — Lori L Baker

(57) ABSTRACT

The bidet system may include multiple seat scales which may float between the toilet bowl rim and the toilet seat. These seat scales may collect measurements which are transmitted to a controller. The controller may include instructions to calculate a user's center of mass based on the measurements and to identify the position of the user's anus based on the center of mass. The controller may then transmit instructions to a bidet wand directing direct the bidet wand to a position which aims a cleansing fluid spray toward the user's anus. A camera which collects images of the user's anal and urogenital region may also be included in the bidet system. The camera may transmit obfuscated images to the controller to identify other areas of the user's anatomy in need of cleansing. The controller may direct the bidet wand to aim a cleansing fluid spray toward these areas.

4 Claims, 9 Drawing Sheets

AUTOMATIC BIDET WAND AIMING SYSTEM BASED ON USER'S CENTER OF MASS

BACKGROUND

Field of the Invention

This disclosure relates to an apparatus to automatically aim a bidet wand towards a defined anatomical area of a user based on a calculation of the user's center of mass.

Background of the Invention

When a user is seated on a toilet and actuates a bidet wand, the initial position of the bidet stream is likely to vary from the optimal cleaning position. When using a typical bidet system, the user must adjust the position of the bidet wand to direct the stream to clean the desired anatomical area. Some toilets include memory preset options to direct the bidet want to the same position each time the same user actuates the bidet system. However, the user may not always sit on the toilet seat in exactly the same position during each use causing inaccuracy in the stream direction. Another problem is that young children tend to sit in a more forward position than adults when using a toilet seat designed for adults. Consequently, a typical bidet wand is likely to spray the young child on the back rather than the anal or urogenital area. In yet another example, a user with limited dexterity may find it difficult to actuate electronic controls which adjust a bidet wand. As a result, these individuals may lose their independence when it becomes difficult to toilet themselves. This inability to clean oneself leads to health and social problems and burdens on caregivers. A bidet system is needed which automatically aims the bidet wand at a desired anatomical site each time a user actuates the bidet wand system.

BRIEF SUMMARY OF THE INVENTION

We disclose a bidet system which may be included on a toilet. The bidet system may include multiple seat scales disposed between the underside of a toilet seat and a rim of a toilet bowl on the toilet. The bidet system may include a bidet system controller which receives transmitted measurements from the seat scales. More specifically, when a user sits on the toilet seat, each seat scale takes a measurement and transmits the measurement to the bidet system controller. The bidet system controller may include non-transient computer-readable medium which includes instructions to calculate the user's center of mass from the measurements. The non-transient computer-readable medium may also include instructions for estimating the position of the user's anus based on the calculated center of mass and information about human anatomy.

The bidet wand system may also include a bidet wand comprising a bidet rod and a bidet nozzle. The bidet system controller may transmit instructions to the bidet wand which cause it to move to a position that best aims the cleansing fluid spray toward the user's anus. In some embodiments, the bidet rod may move up, down, left, or right. In some embodiments, the nozzle may rotate up to 360°.

In some embodiments, the bidet system includes a floor scale which may be positioned on the floor in front of the toilet. A user's feet may be placed on the floor scale when the user sits on the toilet seat. The floor scale may collect a mass measurement and transmit that mass measurement to the bidet system controller. This mass measurement may be included in the calculations to identify the user's center of mass along with the measurements collected by the seat scales.

Some embodiments of the disclosed bidet system may include a camera. The camera may include a lens which is positioned inside the toilet bowl and directed upward towards the orifice defined by the toilet seat. Accordingly, the lens may be directed towards the user's anal and urogenital region when the user is seated on the toilet seat. The camera may include a camera controller which obfuscates images taken by the camera for privacy and security. The obfuscated images may be transmitted to the bidet system controller. The non-transient computer-readable medium within the bidet system controller may include instructions to identify the user's anus, a female urogenital region, or injuries in need of cleaning from the obfuscated images. This information, along with the calculated center of mass, may be used to identify the position of the regions of the user's anatomy in need of cleansing and to direct the bidet wand to aim a cleansing fluid spray toward those regions.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood regarding the following description and accompanying drawings where.

DETAILED DESCRIPTION OF THE INVENTION

Figure 1A:
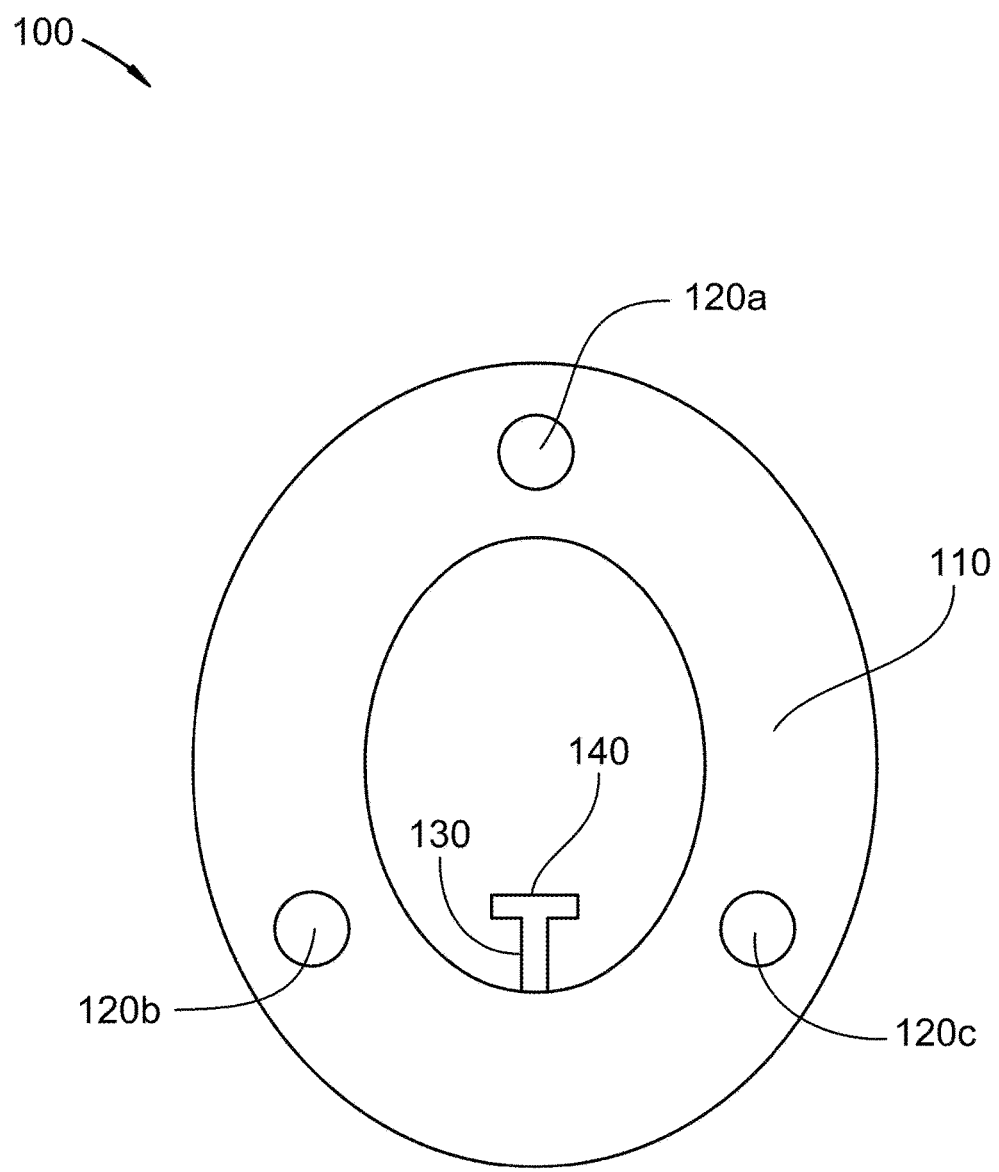
FIG. 1A illustrates an aerial view of an embodiment of the disclosed bidet system in which the toilet seat includes three seat scales.

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

The disclosed bidet system estimates the position of a user's anus by calculating the user's center of mass while seated on the toilet. The toilet seat includes multiple seat scales and, in an embodiment, the toilet seat floats on these seat scales. For example, the toilet seat may include three seat scales: one in the rear left region, one in the rear right region, and one in the front and center of the toilet seat. In another embodiment, the toilet seat may have four seat scales: one in the rear left region, one in the rear right region, one in the front left region, and one in the front right region of the toilet seat. Applicants define front as the direction the user faces when seated on the toilet and rear as the direction approximately behind the user when seated on the toilet. In another embodiment, the toilet seat has between 5 and 25 seat scales.

The seat balances may be in electronic communication with a bidet system controller comprising non-transitory computer-readable medium. The non-transitory computer-readable medium may include instructions for calculating the user's center of mass while the user is seated on the toilet. The instructions may follow an algorithm which uses the measurements from the multiple seat scales on the toilet seat to calculate the position of the user's center of mass. The result of this calculation may change if the same user sits in a different position on the toilet seat. Based, on known human anatomical parameters, the algorithm may estimate the user's center of mass at the time the user is seated on the toilet to estimate the location of the user's anus. The non-transient computer-readable medium may then transmit instructions which direct the movement of the bidet wand to direct a cleansing fluid spray toward the calculated position of the user's anus.

In some embodiments, the non-transitory computer-readable medium on the bidet system controller includes instructions to classify different parts of the user's anatomy. The instructions may direct the bidet wand to modulate the force of the cleansing fluid spray according to the class of anatomical part. For example, the instructions may direct the bidet wand to emit a more forceful cleansing fluid spray toward a user's anus than toward an episiotomy incision or other injury.

In some embodiments, the toilet seat includes one or more hinges on a rear side of the toilet seat enabling the seat to lift up and down. The non-transient computer-readable medium may include instructions to correct the center of mass calculations by subtracting the impact of the pressure applied by the one or more hinges.

In some embodiments, machine learning may be utilized to more accurately estimate the user's center of mass over time as the user repeatedly uses the bidet system. More specifically, each time the user actuates the bidet system, the user may provide feedback about how well the cleansing fluid spray from the bidet wand hit its target. This may be accomplished by adjusting the bidet wand using electronic controls. Each time the same user actuates the bidet system and provides correction, the bidet system may more accurately aim toward the desired target.

In another embodiment, the disclosed bidet system includes a floor scale which may be positioned on the floor in front of the toilet. The user's feet may be placed on the floor scale when the user is seated on the toilet seat. The mass measurement taken by the floor scale, along with the measurements taken by the seat scales, may be included in the calculation which estimates the user's center of mass while seated on the toilet. For example, if a user leans forward or backward while using the toilet, the user places more or less mass on the floor scale respectively. At the same time, the position of the user's anus relative to the toilet and the bidet wand changes. The instructions provided in the non-transient computer-readable medium may adjust the calculated center of mass according to the mass measured by the floor scale.

In some embodiments, the toilet may include a camera positioned within the toilet bowl. The lens of the camera may be directed toward the orifice approximately in the center of and defined by the toilet seat. Accordingly, the camera lens is directed toward the user's anus and urogenital region when the user is seated on the toilet seat. The camera may capture an image of the user's anal and urogenital region when the user actuates the bidet system. Before the image leaves the camera, it may be obfuscated such that the original image cannot be reconstructed. A camera controller within the camera may comprise non-transitory computer-readable medium which converts the original image to an obfuscated image. The camera controller may be in electronic communication with the bidet system controller. The camera controller may transmit the obfuscated image to the bidet system controller. Machine learning techniques may identify the position of the user's anus and urogenital region using instructions in the non-transitory computer-readable medium.

In addition, the obfuscated image from the camera may identify anatomical parts in addition to the anus which the user may wish to be cleansed by the cleansing fluid spray. These may include a female urogenital region or an injured region which may need to be kept clean to avoid infection. An example of the latter instance is the perineal area of a female user after receiving an episiotomy during childbirth. Other examples include incisions received during surgical procedures, traumatic injuries, and skin pathologies.

In response to the aiming instructions received from the bidet system controller, the bidet wand may direct the cleansing fluid spray from the nozzle by moving forward and back as well, left and right, and/or up and down. Through this enhanced range of motion, the bidet wand may be able to more directly position itself to direct the cleansing fluid spray towards its target than existing bidet systems.

In an example, the bidet wand includes two tubes with nozzles both facing inward towards each other. Each of the two nozzles may emit a fluid stream. The two fluid streams may meet at a point between the two nozzles and the pressure at this point may direct a cleansing fluid spray outward away from the point and toward the user. The tubes may be connected to independent pressure regulators. As the fluid pressure changes between the two nozzles, the cleansing fluid spray emitting outward from the point of intersection between the two fluid streams may be directed left or right.

In another embodiment, the bidet wand includes a flexible rod which includes a fixed nozzle. The flexible rod may be flexible only toward the left or right directions. Otherwise, the rod may be rigid. Two or more cables may be positioned within the rod and the cables may be in mechanical communication with a motor. The motor may use gears, pulleys, or other apparatuses known in the art to pull on one or more of the cables. This action shortens the length of the one or more cables causing the corresponding side of the rod to retract. The rod is thereby pulled to that corresponding side and, consequently, the nozzle is aimed in that direction.

In another embodiment, a gear system may be attached to the rod of the bidet wand. The gear system may apply a moment causing the entire rod to rotate either clockwise or counterclockwise on a fixed axis from a point at an end of the rod that is furthest from the nozzle. The nozzle may then rotate left or right.

In another embodiment, the interior of the bidet rod is attached to a sliding rod. The sliding rod may have a fulcrum at a seal between the toilet bowl and the interior of the toilet. This seal may be disposed at the rear section of the toilet bowl from where a typical bidet wand extends. As the sliding rod moves forward and rearward, the bidet rod around it moves forward and rearward.

In another embodiment, the nozzle at the end of the rod in the bidet wand is built into a ball joint. The ball joint may rotate, thus directing the nozzle in any desired direction.

In another embodiment, the rod of the bidet wand is positioned on a hinge at the end furthest from the nozzle. The rod, and consequently, the bidet wand, may move left and right on the hinge.

In another embodiment, inflatable bladders may use pneumatics to push parts of the bidet wand mechanism from one position to another.

Referring now to the drawings, FIG. 1A is an aerial view of toilet bowl 100 which includes an embodiment of the disclosed bidet system. Toilet bowl rim 110 is in connection with three seat scales: seat scale 120a in the front center position of the toilet bowl rim 110, seat scale 120b at the rear left position, and seat scale 120c at the rear right position. The seat scales may be embedded in a toilet seat which is not shown for purposes of clarity. A bidet wand is shown extending from a position toward the rear of the toilet bowl (below toilet bowl rim 110) which includes bidet rod 130 and nozzle 140.

Figure 1B:
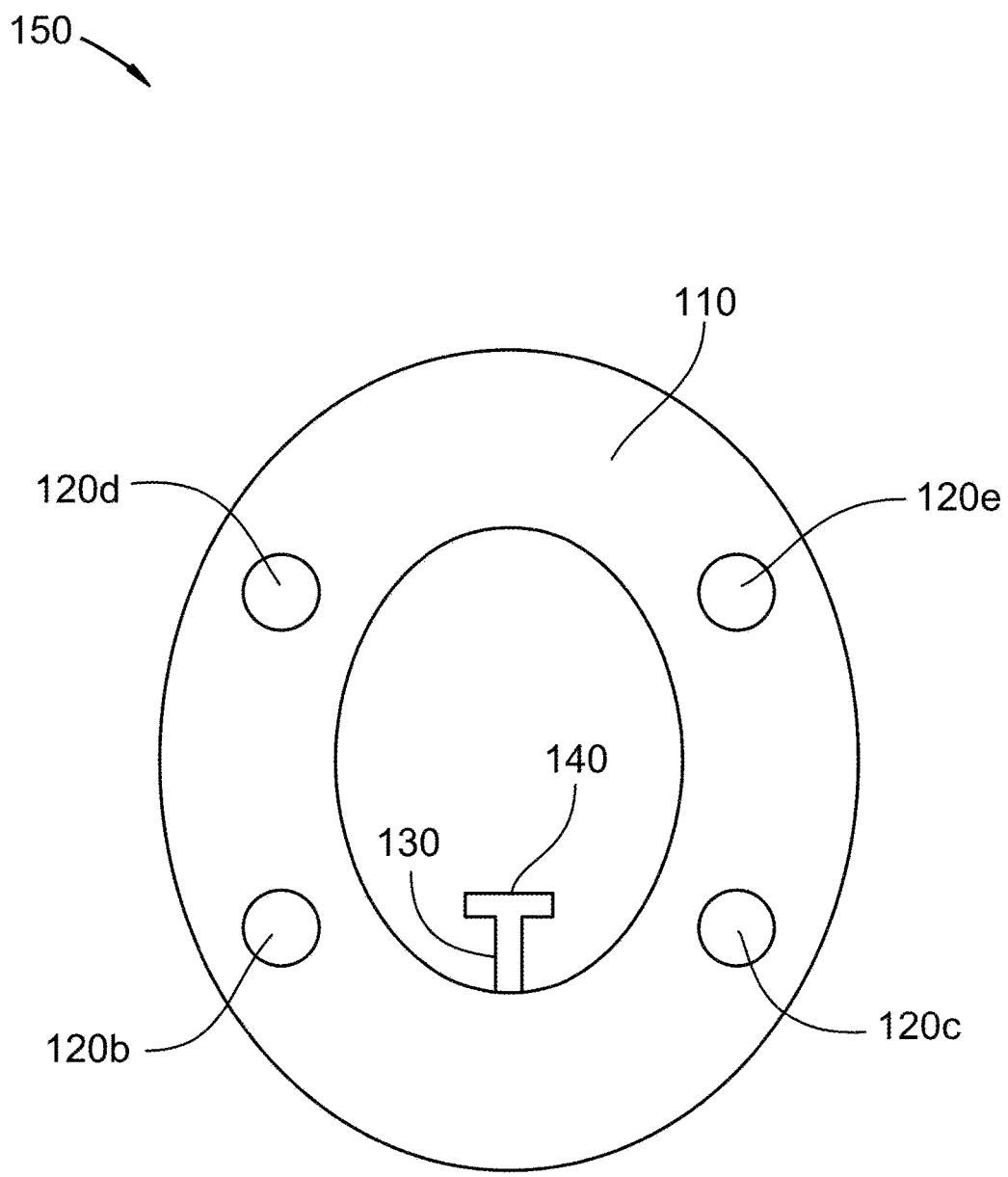
FIG. 1B illustrates an aerial view of an embodiment of the disclosed bidet system in which the toilet seat includes four seat scales.

FIG. 1B is an aerial view of toilet bowl 150 which is a slightly different embodiment of the toilet bowl shown in FIG. 1A. In this embodiment, toilet bowl rim 110 in connection with four seat scales. In addition to seat scales 120b and 120c in the positions originally shown in FIG. 1A, this embodiment includes seat scale 120d at the front left position of toilet bowl rim 110 and seat scale 120e at the front right position. Seat scale 120a shown in FIG. 1A at the front center position of toilet bowl rim 110 is not present in this embodiment although it may be included as a fifth seat scale in other embodiments.

Figure 1C:
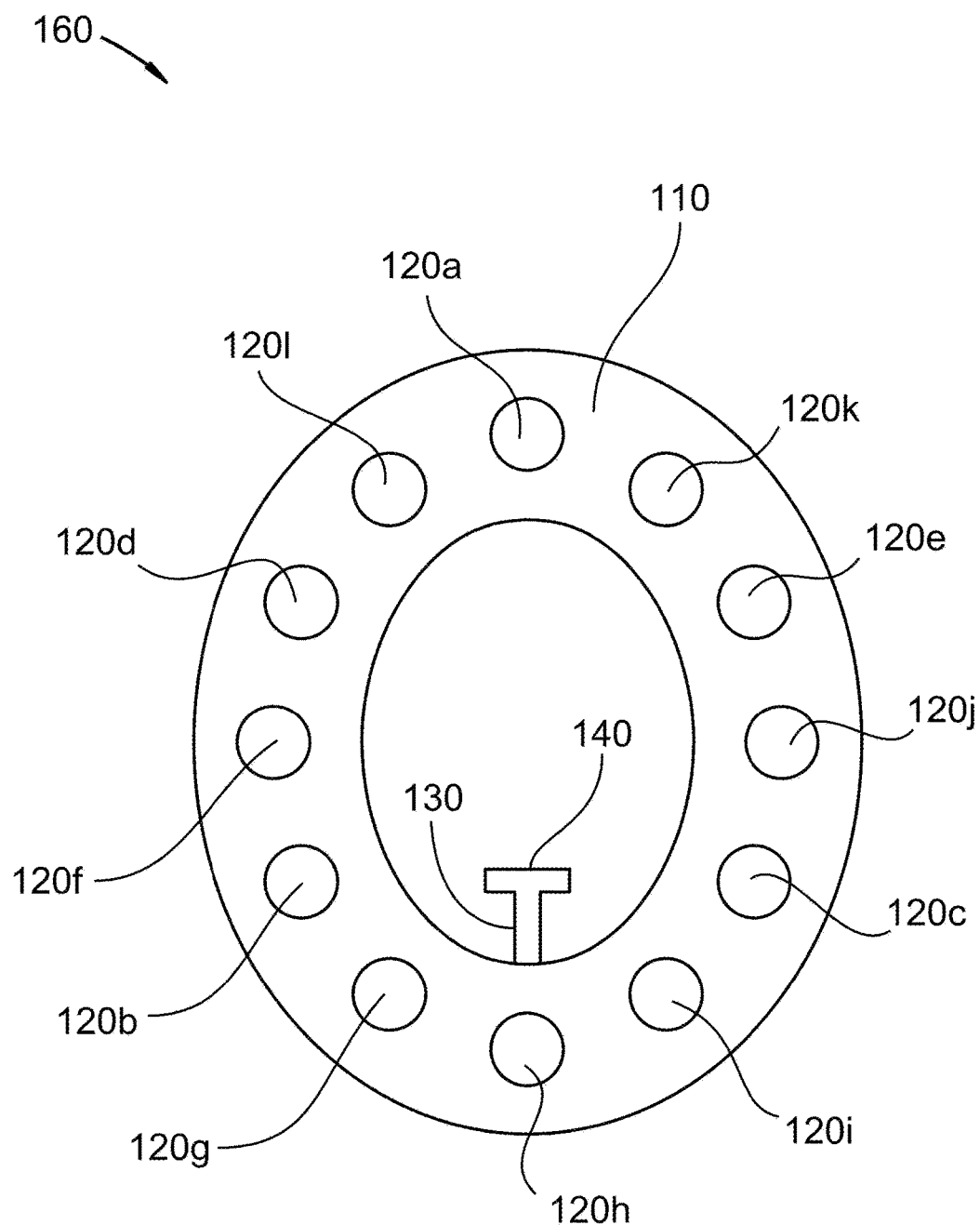
FIG. 1C illustrates an aerial view of an embodiment of the disclosed bidet system in which the toilet seat includes a plurality of seat scales.

FIG. 1C shows an aerial view of toilet bowl 160 which is yet another embodiment of a toilet bowl which may be included in the disclosed bidet system. In the embodiment of FIG. 1C, toilet bowl rim 110 is in connection with twelve seat scales. These include seat scales 120a-d as shown in in either FIG. 1A or 1B. Also shown are seat scales 120e-1.

Figure 2:
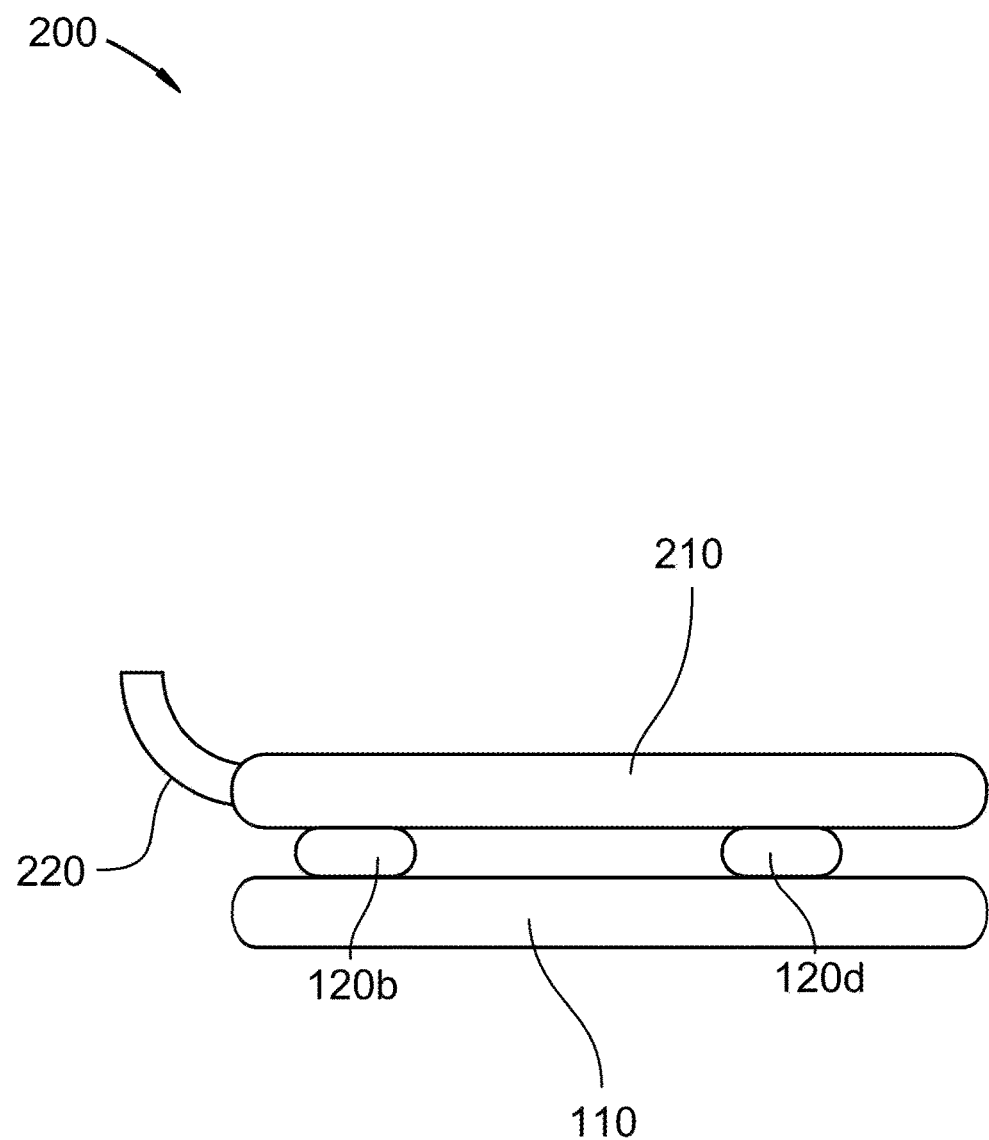
FIG. 2 illustrates a schematic side view of a toilet seat included in an embodiment of the disclosed bidet system

FIG. 2 shows a view of the toilet which includes seat scales in the configuration shown in FIG. 1B as seen from the left side of the toilet. Seat scales 120b and 120d are shown floating below toilet seat 210 and above toilet bowl rim 110 of a toilet bowl. Hinge 220 is in connection with a rear side of toilet seat 110 allowing toilet seat 110 to raise and lower. As discussed above, the mass that hinge 220 places on the balances may be subtracted from the mass of the user as the bidet system controller calculates the user's center of mass.

Figure 3A:
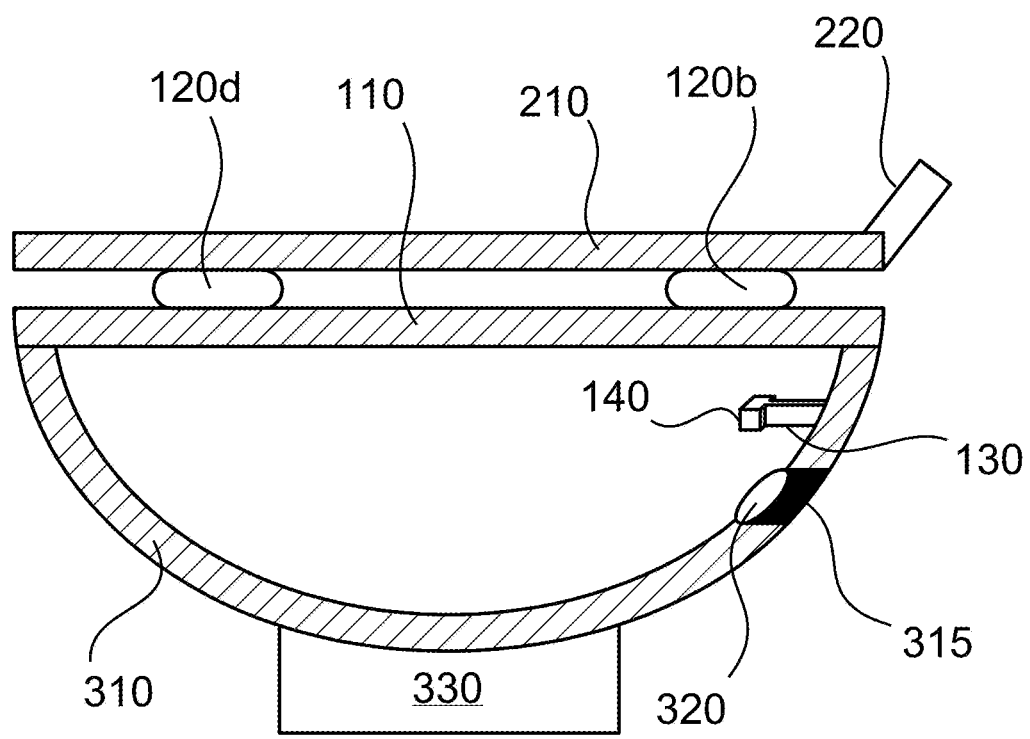
FIG. 3A illustrates an aerial view of an embodiment of the disclosed bidet system including a camera for identifying anatomical parts.

FIG. 3A shows a cross-sectional view of a toilet bowl which may be included in embodiment of the disclosed bidet system. Toilet bowl 310 includes camera 315 which includes camera lens 320. Camera lens 320 is directed upward toward toilet bowl rim 110 of toilet bowl 310 and toward toilet seat 210. When a user is seated on seat 210, the user's anal and urogenital regions are in the view of lens 320. Therefore, camera 315 may collect photos which may be used to identify the desired direction the bidet nozzle should dispense liquid. A camera controller may obfuscate the photos then transmit them to bidet system controller 330.

Figure 3B:
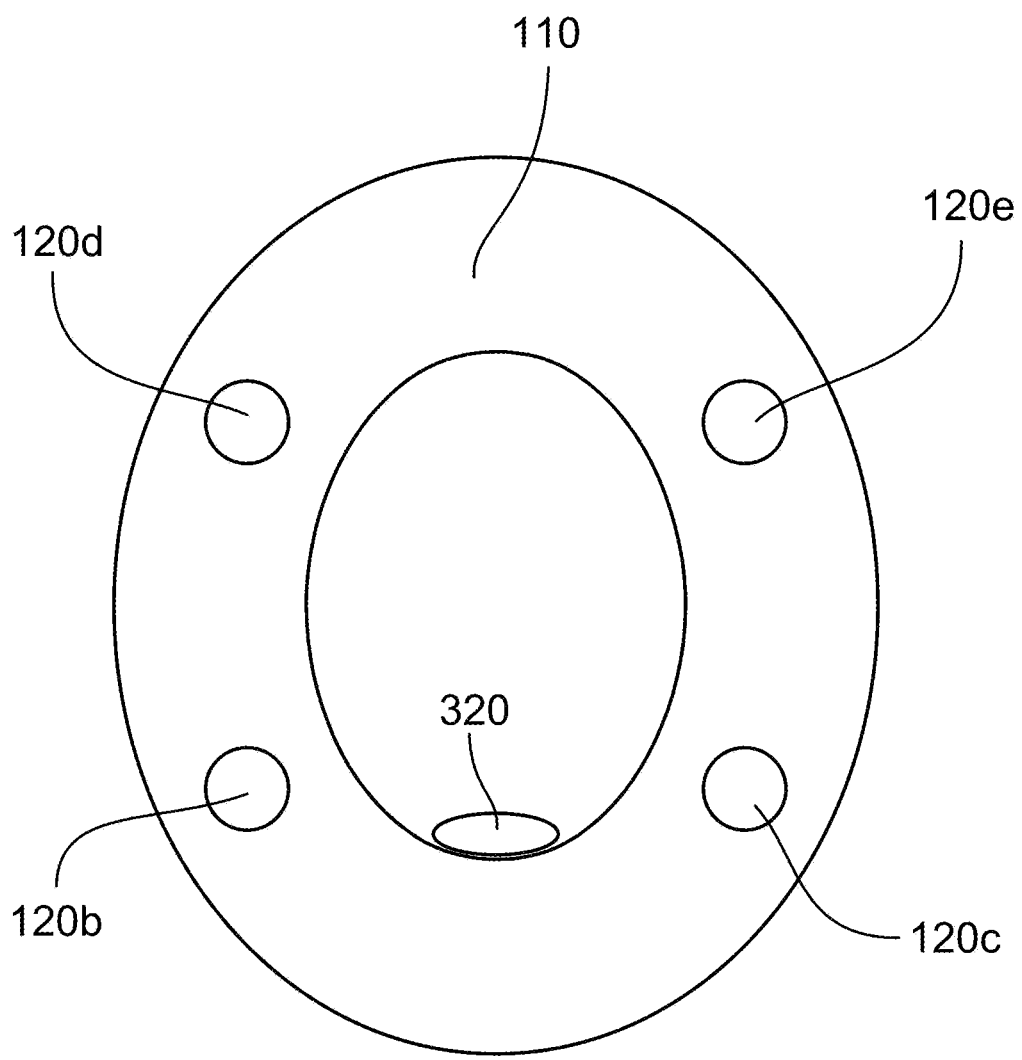
FIG. 3B illustrates a cross-sectional view of the embodiment of FIG. 3A.

FIG. 3B illustrates an aerial view of the toilet bowl of FIG. 3A. Camera lens 320 is visible and is aimed upward from the inner volume of toilet bowl 110.

Figure 4:
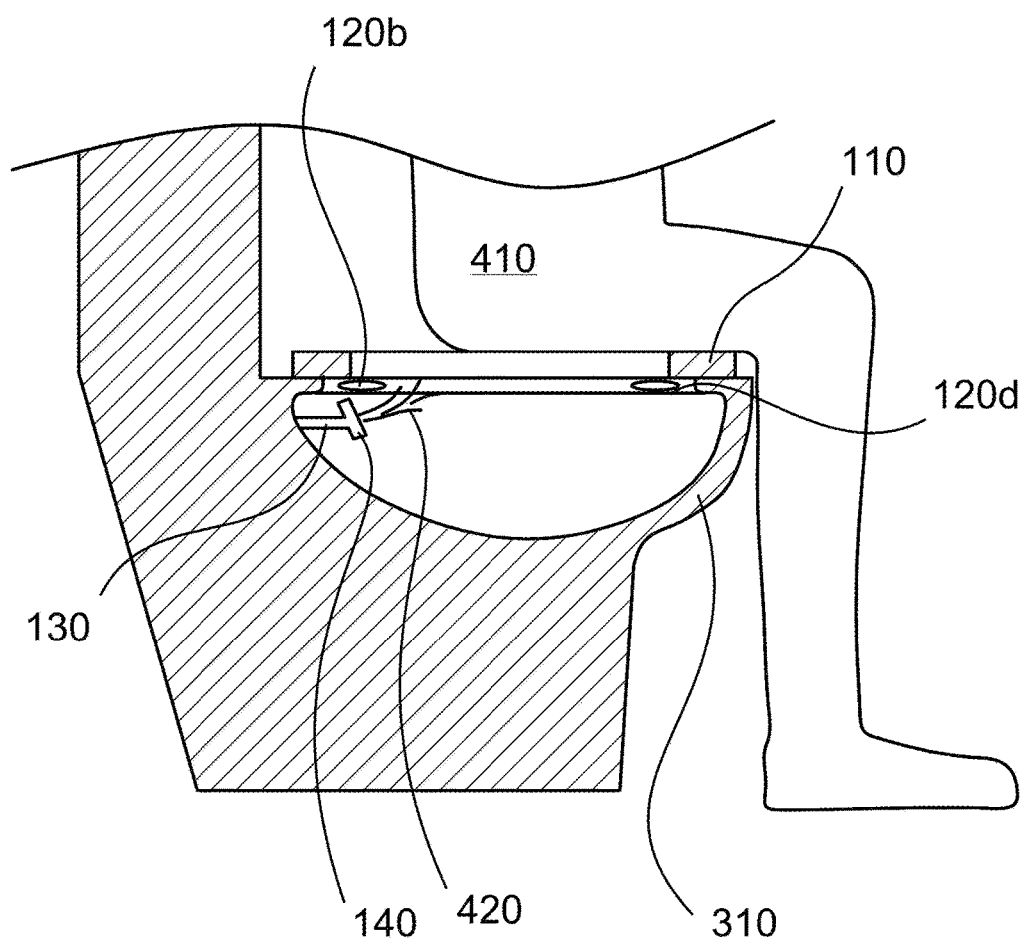
FIG. 4 illustrates a cross-sectional view of an embodiment of the disclosed bidet system with a user seated on the toilet.

FIG. 4 illustrates a cross-sectional view of a toilet including an embodiment of the disclosed bidet system. User 410 us seated on toilet seat 210. Seat scales 120b and 120d float between seat 210 and rim 110. The bidet system has identified the user's center of mass and used this determination to estimate the position of the user's anus. Bidet rod 130 is shown properly extended a position that is approximately below the user's anus and nozzle 140 is shown tilted to more directly aim cleansing fluid spray 420 toward the user's anus.

Figure 5A:
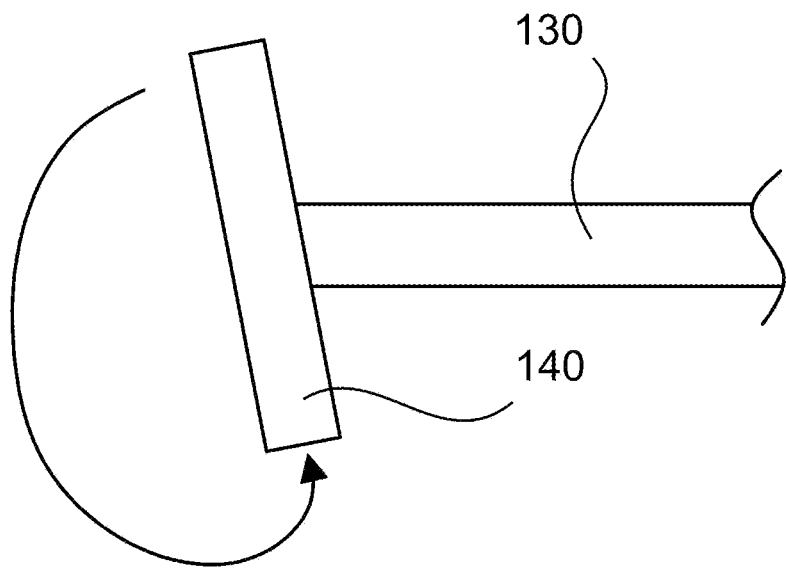
FIG. 5A illustrates a schematic drawing of a bidet wand according to an embodiment of the disclosed bidet system in which the nozzle rotates 360°.
Figure 5B:
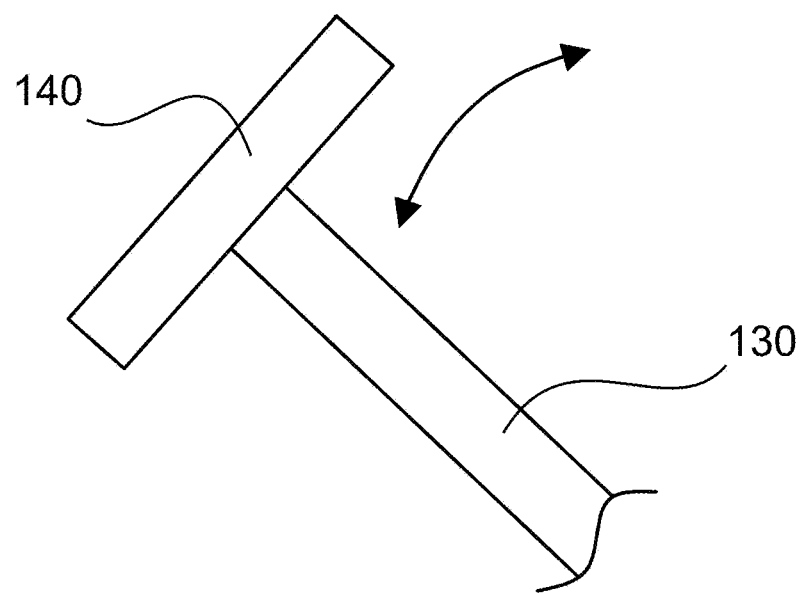
FIG. 5B illustrates a schematic drawing of a bidet wand according to an embodiment of the disclosed bidet system and shown as an aerial view in which the bidet wand may move left to right.
Figure 5C:
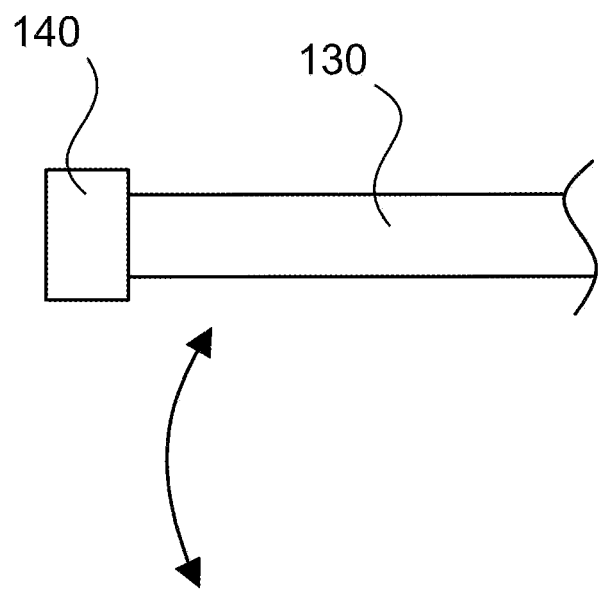
FIG. 5C illustrates a schematic drawing of a bidet wand according to an embodiment of the disclosed bidet system in which the bidet wand may move up or down.

FIGS. 5A-C shows different mobilities that the bidet rod or bidet nozzle may possess to direct the cleansing fluid spray to the desired area on a user. FIG. 5A illustrates an embodiment of nozzle 140 on bidet rod 130 in which nozzle 140 may rotate up to 360° as shown by the arrow. In some embodiments, nozzle 140 may be connected to bidet rod 130 with a ball joint.

FIG. 5B illustrates an aerial view of bidet rod 130 and nozzle 140. As illustrated by the double headed arrow, bidet rod 130 may move clockwise or counterclockwise along the perimeter of a circle. This results in nozzle 140 moving right or left. This movement may be accomplished by connecting an end of bidet rod 130, which is opposite that connected to nozzle 140, with a hinge.

FIG. 5C illustrates a side view of bidet rod 130 and nozzle 140. As illustrated by the double headed arrow, bidet rod 130 may move clockwise or counterclockwise along the perimeter of a circle which is perpendicular to the circle discussed above with regard to FIG. 5B. This results in nozzle 140 moving up or down. This movement may be accomplished by connecting an end of bidet rod 130, which is opposite that connected to nozzle 140, with a hinge which is perpendicular to the hinge discussed above with regard to FIG. 5B.

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

We claim:

1. A bidet wand positioning system comprising:
   a toilet seat;
   a plurality of seat scales in mechanical connection with an under side of the toilet seat, wherein the plurality of seat scales comprises three balances;
   a bidet wand comprising a nozzle, wherein the bidet wand emits a cleansing fluid spray from the nozzle;
   a bidet system controller comprising a non-transitory computer-readable medium, wherein the bidet system controller receives measurements of mass from each of the plurality of seat scales, wherein the non-transitory computer-readable medium comprises instructions for calculating a center of mass of a user seated on the toilet seat using the measurements of mass, wherein the non-transitory computer readable medium comprises instructions for estimating a location of the user's anus based on the calculated center of mass, wherein the system controller sends an electronic signal to the bidet wand directing the bidet wand to emit a cleansing fluid spray toward the calculated location of the user's anus.

2. The bidet wand positioning system of claim 1, wherein the three seat scales are in connection with a front center, a rear left, and a rear right side of the underside of the toilet seat.

3. A bidet wand positioning system comprising:
a toilet seat;
a plurality of seat scales in mechanical connection with an under side of the toilet seat;
a bidet wand comprising a nozzle, wherein the bidet wand emits a cleansing fluid spray from the nozzle;
a bidet system controller comprising a non-transitory computer-readable medium, wherein the bidet system controller receives measurements of mass from each of the plurality of seat scales, wherein the non-transitory computer-readable medium comprises instructions for calculating a center of mass of a user seated on the toilet seat using the measurements of mass, wherein the non-transitory computer readable medium comprises instructions for estimating a location of the user's anus based on the calculated center of mass, wherein the system controller sends an electronic signal to the bidet wand directing the bidet wand to emit a cleansing fluid spray toward the calculated location of the user's anus; and
a hinge, wherein the hinge is in mechanical connection with the toilet seat, and wherein the non-transitory computer-readable medium in the system controller subtracts the mass of the hinge from the mass measurements collected by the plurality of seat scales.

4. A bidet wand positioning system comprising:
a toilet seat;
a plurality of seat scales in mechanical connection with an under side of the toilet seat, wherein the toilet seat floats on the plurality of seat scales;
a bidet wand comprising a nozzle, wherein the bidet wand emits a cleansing fluid spray from the nozzle;
a bidet system controller comprising a non-transitory computer-readable medium, wherein the bidet system controller receives measurements of mass from each of the plurality of seat scales, wherein the non-transitory computer-readable medium comprises instructions for calculating a center of mass of a user seated on the toilet seat using the measurements of mass, wherein the non-transitory computer readable medium comprises instructions for estimating a location of the user's anus based on the calculated center of mass, wherein the system controller sends an electronic signal to the bidet wand directing the bidet wand to emit a cleansing fluid spray toward the calculated location of the user's anus.

* * * * *